US012157562B2

(12) United States Patent
Medici et al.

(10) Patent No.: US 12,157,562 B2
(45) Date of Patent: Dec. 3, 2024

(54) HELICOPTER, HELICOPTER KIT AND ASSOCIATED RECONFIGURATION METHOD

(71) Applicant: LEONARDO S.P.A., Rome (IT)

(72) Inventors: Luca Medici, Samarate (IT); Stefano Melone, Samarate (IT)

(73) Assignee: LEONARDO S.P.A., Rome (IT)

( * ) Notice: Subject to any disclaimer, the term of this patent is extended or adjusted under 35 U.S.C. 154(b) by 121 days.

(21) Appl. No.: 17/788,028

(22) PCT Filed: Dec. 23, 2020

(86) PCT No.: PCT/IB2020/062391
§ 371 (c)(1),
(2) Date: Jun. 22, 2022

(87) PCT Pub. No.: WO2021/130692
PCT Pub. Date: Jul. 1, 2021

(65) Prior Publication Data
US 2023/0022308 A1    Jan. 26, 2023

(30) Foreign Application Priority Data

Dec. 23, 2019    (EP) .................................... 19219521

(51) Int. Cl.
*B64C 27/82*    (2006.01)
*B64C 5/02*    (2006.01)
*B64C 5/06*    (2006.01)

(52) U.S. Cl.
CPC ............... *B64C 27/82* (2013.01); *B64C 5/02* (2013.01); *B64C 5/06* (2013.01); *B64C 2027/8272* (2013.01); *B64C 2027/8281* (2013.01)

(58) Field of Classification Search
CPC .............. B64C 2027/8281; B64C 5/02; B64C 2003/145
See application file for complete search history.

(56) References Cited

U.S. PATENT DOCUMENTS 2,353,856 A    7/1944    Shannon
8,657,226 B1    2/2014    McGinnis
(Continued)

FOREIGN PATENT DOCUMENTS

CN    109466744 A  *  3/2019    ............... B64C 5/02
KR    20150062948 A  *  6/2015

OTHER PUBLICATIONS

International Search Report and Written Opinion in corresponding International Patent Application No. PCT/IB2020/062391 mailed Mar. 17, 2021 (13 pages).

*Primary Examiner* — Philip J Bonzell
*Assistant Examiner* — Anna L. Gordon
(74) *Attorney, Agent, or Firm* — Leason Ellis LLP

(57) ABSTRACT

A helicopter is described comprising: a tail boom; a fin projecting from the tail boom; and a tailplane arranged at the tail boom and transversal to the fin; at least one of the fin and the tailplane defining a first aerodynamic surface generating a first aerodynamic force; at least one first element transversal to the first aerodynamic surface; and a second aerodynamic surface generating a second aerodynamic force, connected to the first element, facing and spaced from the first aerodynamic surface; the second aerodynamic surface is spaced from the other of the fin and the tailplane.

15 Claims, 3 Drawing Sheets

(56) References Cited

U.S. PATENT DOCUMENTS

| | | | |
|---|---|---|---|
| 8,985,500 B2 | 3/2015 | Borie et al. | |
| 9,205,911 B2* | 12/2015 | Beroul | B64C 27/82 |
| 2007/0221789 A1* | 9/2007 | Lee | B64C 9/18 |
| | | | 244/211 |
| 2015/0048215 A1* | 2/2015 | McGinnis | B64C 23/069 |
| | | | 244/90 R |
| 2017/0334552 A1* | 11/2017 | Seifert | F16F 7/01 |
| 2018/0327078 A1* | 11/2018 | Lanigan | B64C 27/06 |

* cited by examiner

HELICOPTER, HELICOPTER KIT AND ASSOCIATED RECONFIGURATION METHOD

CROSS-REFERENCE TO RELATED APPLICATIONS

This patent application is a U.S. National Phase Application under 35 U.S.C. § 371 of International Patent Application No. PCT/IB2020/062391, filed on Dec. 23, 2020, which claims priority from European patent application no. 19219521.2, filed on Dec. 23, 2019, the entire disclosure of which is incorporated herein by reference.

TECHNICAL FIELD

The present invention relates to a helicopter, a helicopter kit and a helicopter reconfiguration method.

BACKGROUND ART

Helicopters comprise, in a known manner, a fuselage, a main rotor projecting from the fuselage and rotatable about a first axis, and a tail rotor projecting from the fuselage and rotatable about a second axis transversal to the first axis.

In particular, the main rotor is adapted to provide the lift necessary to sustain the helicopter in the air and to allow the forward/backward and lateral movement of the helicopter. The tail rotor is instead adapted to counter the rotation of the helicopter that would be caused by the reaction torque transmitted to the fuselage by operation of the main rotor, and to control the helicopter's yaw, i.e. the rotation about the first axis.

Helicopters also comprise, in a known manner:
- a nose and a tail boom arranged on respectively opposite ends of the fuselage;
- a fin projecting upwards in a cantilever fashion from a tail boom of the fuselage and supporting the tail rotor in a rotatable manner about the second axis; and
- a tailplane projecting in a cantilever fashion from the tail boom, laterally to the fuselage, and known as a pitch-stabilizer.

The fin is shaped with a wing profile configured to generate a first aerodynamic force with a main component parallel to the second axis.

In this way, when the helicopter is in high-speed forward flight, the first aerodynamic force generated by the fin creates a counter torque that is added to that generated by the tail rotor and enables keeping the helicopter at a desired yaw angle with respect to a fixed direction.

In consequence, from the design viewpoint it is desirable to increase the surface of the fin in order to increase the value of the first aerodynamic force when the helicopter is in high-speed forward flight.

However, this surface increase of the fin causes an increase in the aerodynamic resistance in cases of lateral flight of the helicopter.

There is consequently awareness in the industry of the need to optimize the aerodynamic behaviour of the fin so as to increase the value of the first aerodynamic force in high-speed forward flight without increasing the aerodynamic resistance in the case of lateral flight.

The tailplane is configured with a wing profile that generates, when the helicopter is in forward flight, a second aerodynamic force, lift/negative lift, with a main component directed parallel to the first axis.

This lift/negative lift is added to the lift generated by the main rotor and is effective in keeping the helicopter's attitude in stable conditions during high-speed forward flight, i.e. in ensuring that the helicopter is in a position of stable equilibrium with reference to the vertical direction and to the rotation about a third longitudinal axis of the helicopter. In particular, the third axis é parallel to a direction of extension of the fuselage oriented from a nose to the tail boom and is transversal to the first and second axes.

However, in certain low-speed conditions, it can happen that the airflow directed downwards by the main rotor is deviated towards the tail of the fuselage, striking the tailplane, and thus generating a third aerodynamic force, namely a downward thrust thereon.

Following acceleration and/or deceleration of the helicopter, this thrust causes a nose-up attitude on the helicopter, i.e. an attitude in which the nose of the fuselage is higher than the tail of the fuselage. This nose-up attitude must be continually corrected by the pilot acting on the cyclic pitch of the main rotor, i.e. by tilting the main rotor disc forwards so as to move the airflow away from the tailplane.

This makes flight control difficult for the pilot in certain low-speed conditions.

Moreover, the nose-up attitude in the landing phase causes visibility problems for the pilot, which can become even more problematic in cases of gusty wind, poor weather conditions or the presence of obstacles in the landing area.

Due to the above, the design of the tailplane must satisfy two conflicting constraints.

In greater detail, on one hand, a large tailplane surface is required to generate an adequate value for the second aerodynamic force and therefore increase the longitudinal stability of the helicopter.

On the other hand, a small tailplane surface is optimal at low speed to reduce the surface exposed to the downward airflow generated by the main rotor and the amount of the helicopter's consequent nose-up, and therefore improves the helicopter's visibility and manoeuvrability in particularly critical conditions, such as landing.

Due to these constraints, various tailplane configurations have been used on helicopters starting from the 1950s without achieving an optimal solution. For example, there are known asymmetric tailplanes that are arranged on only one side of the fuselage and at different heights with respect to the tail boom, and symmetrical solutions with two stabilizers arranged at different heights and different longitudinal positions with respect to the fuselage.

U.S. Pat. No. 8,985,500 describes a helicopter comprising a tailplane comprising:
- a pair of stabilizers, projecting in a cantilever fashion from a respective side of the tail boom;
- a pair of aerodynamic appendages superimposed on the respective stabilizers and projecting in a cantilever fashion from a respective side of the fuselage; and
- a pair of end plates opposite to the respective sides and extending between each stabilizer and the relative appendage.

When the helicopter is in high-speed forward flight, the aerodynamic wash generated by the fuselage and the main rotor significantly disturb the airflow that strikes the portions of the appendages next to the fuselage.

In consequence, these portions are aerodynamically "in the shadow" and do not effectively contribute to the creation of the second aerodynamic force necessary for stabilizing the helicopter longitudinally.

There is therefore awareness in the industry of the need to optimize the aerodynamic behaviour of the tailplane so as to increase the helicopter's longitudinal stability in forward flight while, at the same time, limiting the nose-up phenomenon in low-speed conditions.

There is also awareness in the industry of the need to optimize the aerodynamic behaviour of the tailplane and the fin for the angles of attack characteristic of forward flight, lateral flight and the low-speed phases of landing/take-off, limiting or even avoiding any increase in dimensions and/or maximum aerodynamic force generated at the angles of attack typical of stalling.

U.S. Pat. No. 2,353,856 discloses an auxiliary airfoil to prevent turbulent flow over a control surface. The auxiliary airfoil is particularly adaptable on the empennage to smooth the flow over the stabilizer and elevator. The primary purpose of the airfoil is to effect a smooth flow of air over the area adjacent the intersection of two stabilizers when one stabilizer control surface has to be cut to permit the deflection of the other.

U.S. Pat. No. 8,657,226 discloses an aircraft with a pair of wings with relative appendixes. Each appendix is shaped to confer to the relative wing a closed box shape.

DISCLOSURE OF INVENTION

The object of the present invention is to produce a helicopter that enables satisfying at least one of the above-stated needs in a simple and inexpensive manner.

According to the invention, this object is achieved by a helicopter according to claim 1.

The present invention also relates to a kit for a helicopter according to claim 12.

The present invention also relates to a method of reconfiguring a helicopter according to claim 14.

BRIEF DESCRIPTION OF THE DRAWINGS

For a better understanding of the present invention, three preferred non-limitative embodiments thereof are described hereinafter, purely by way of example and with the aid of the accompanying drawings, in which.

BEST MODE FOR CARRYING OUT THE INVENTION

Figure 1:
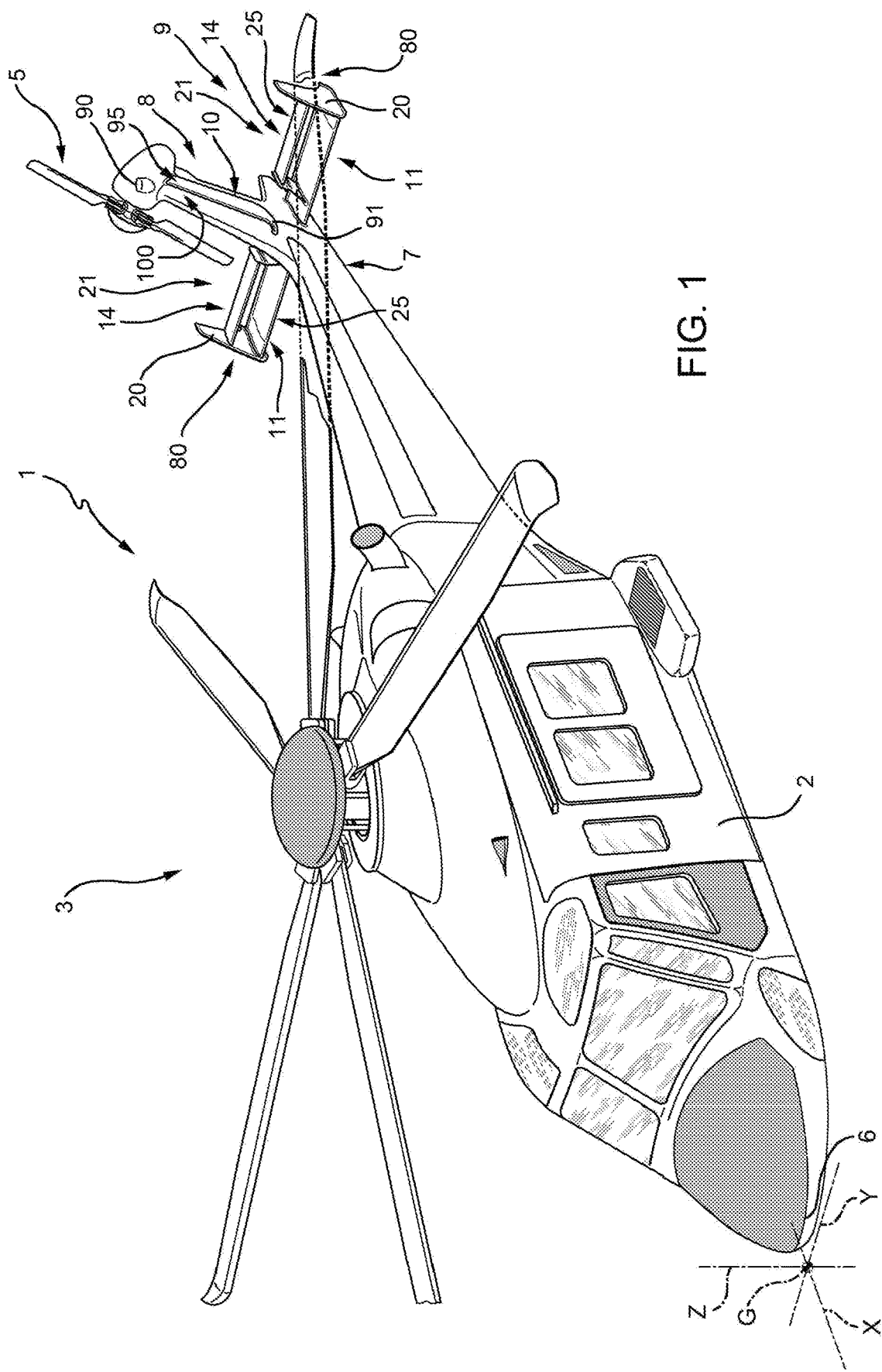
FIG. 1 is a perspective view of a helicopter made according to the present invention.

Referring to the accompanying drawings, reference numeral 1 indicates a helicopter made according to the dictates of the present invention.

The helicopter 1 basically comprises a fuselage 2, a main rotor 3 arranged on top of the fuselage 2 and a tail rotor 5.

The fuselage 2 comprises, at its opposite ends, a nose 6 and a tail boom 7.

It is possible to define:
a roll axis X of the helicopter 1 and corresponding to a longitudinal direction of extension of the fuselage 2;
a pitch axis Y orthogonal to the axis X; and
a yaw axis Z orthogonal to the axes X and Y.

The axes X, Y, Z are integral with the helicopter 1 and are incident at the barycentre G (not indicated in the correct position in the accompanying figures for simplicity of representation) of the helicopter 1.

It should be noted that hereinafter in this description, terms such as "above", "below", "lateral", "at the front", "at the rear" and the like are used with reference to a normal forward direction of the helicopter 1 in forward flight at constant altitude, i.e. a condition in which axis Z is vertical and axes X, Y are horizontal.

The main rotor 3 is adapted to provide thrust with a main component parallel to the axis Z so as to enable sustaining the helicopter 1 in the air, the forward or backward movement parallel to the axis X and the lateral movement in both directions parallel to the axis Y.

The tail rotor 5 is adapted to provide thrust with a main component parallel to the axis Y. This thrust generates torque about the axis Z in the opposite direction to the reaction torque acting on the fuselage 2 following operation of the main rotor 3, so as to control the yaw angle of the helicopter 1.

The nose 6 and the tail boom 7 are opposite to each other along the longitudinal axis X of extension of the helicopter 1.

The helicopter 1 also comprises:
a fin 8 projecting in a cantilever fashion from the top of the tail boom 7, at the end opposite the nose 6; and
a tailplane 9 projecting in a cantilever fashion from the tail boom 7 below the fin 8 and adapted to stabilize the helicopter 1 longitudinally, namely along the axis X.

The fin 8 supports the tail rotor 5.

The fin 8 defines an aerodynamic surface 10, which is configured to generate an aerodynamic force with a main component parallel to the axis Y. In this way, when the helicopter 1 proceeds in high-speed forward flight, the lift generated by the fin 8 contributes to controlling the yaw angle of the helicopter 1.

The tailplane 9 is adapted to generate an aerodynamic force with a main component parallel to the axis Z, so as to longitudinally stabilize the helicopter 1 in forward flight, i.e. to make the attitude of the helicopter 1 stable with regard to rotation about the axis Y.

In greater detail, the tailplane 9 comprises a pair of stabilizers 14 arranged on respective mutually opposite sides of the tail boom 7.

In the following description, reference will be made to just one stabilizer 14, as the stabilizers 14 are identical to one another.

The stabilizer 14 has a length parallel to the axis Y, a width parallel to the axis X and a thickness parallel to the axis Z.

The stabilizer 14 comprises a load-bearing surface 11, which is configured to generate lift/negative lift with a main component parallel to the axis Z.

The surface 11 of the stabilizer 14 is, in turn, delimitated by:
a leading edge 15 facing the nose 2 and defining a first most forward end edge of the stabilizer 14;
a trailing edge 16 opposite to the leading edge 15 along the axis X and defining a second most rearward end edge of the stabilizer 14;

a top surface 17 delimited between the leading edge 15 and the trailing edge 16 and defining an upper surface of the stabilizer 14; and a bottom surface 18 delimited between the leading 15 and trailing 16 edges on the opposite side of the top surface 17, and defining a lower surface of the stabilizer 14.

The surface 11 also comprises a pair of end edges 12a, 12b opposite to each other and parallel to the axis Y. The end edge 12a of each surface 11 is fixed to the tail boom 7.

Advantageously, the stabilizer 14 comprises:

a plate 20 projecting in a cantilever fashion transversely to the surface 11; and an appendage 21 defining a further aerodynamic surface, connected transversely to the plate 20, spaced from the surface 11 parallel to the axis Z, and spaced from the fin 8 parallel to the axis Y.

In greater detail, the plate 20 is opposite to the fin 8 along the axis Y and is connected to the surface 11.

The stabilizer 14 also comprises a further plate 22 projecting in a cantilever fashion from the appendage 21 and connected to the surface 11.

More specifically, the plate 22 is spaced from the plate 20 parallel to the axis Y and interposed between the fin 8 and the plate 20 parallel to the axis Y.

The plate 22 extends transversely to the appendage 21 and to the surface 11.

In this way, the plates 20, 22, the appendage 21 and a portion 23 of the stabilizer 14 interposed between the plates 20, 22 define a closed wing surface 25.

In greater detail, the plate 20 is delimited parallel to the axis Z by an edge 30 arranged adjacent to the surface 11 and by an edge 31 opposite to edge 30.

The plate 20 also comprises a zone 32 interposed between the edges 30, 31 parallel to the axis Z and to which the appendage 21 is connected.

In the case shown, the edge 31 is arranged above the zone 32.

The edges 30, 31 and the zone 32 extend parallel to the axis X.

The appendage 21 is also delimited by:

a leading edge 35 facing the nose 6 and defining a first most forward end edge of the appendage 21;

a trailing edge 36 opposite to the leading edge 15 along the axis X and defining a second most rearward end edge of the appendage 21;

a top surface 37 delimited between the leading edge 35 and the trailing edge 36 and defining an upper surface of the appendage 21; and a bottom surface 38 delimited between the leading edge 35 and the trailing edge 36 on the side opposite to the top surface 37, and defining a lower surface of the appendage 21.

Figure 3:
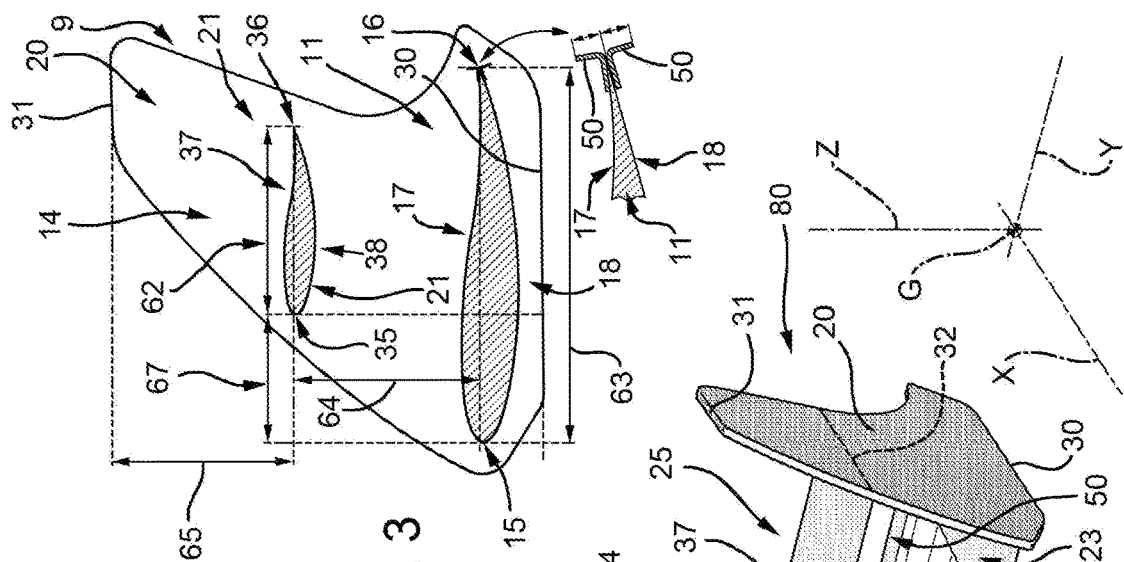
FIG. 3 is a section along line III-III of FIG. 2, with parts removed for the sake of clarity.
Figure 2:
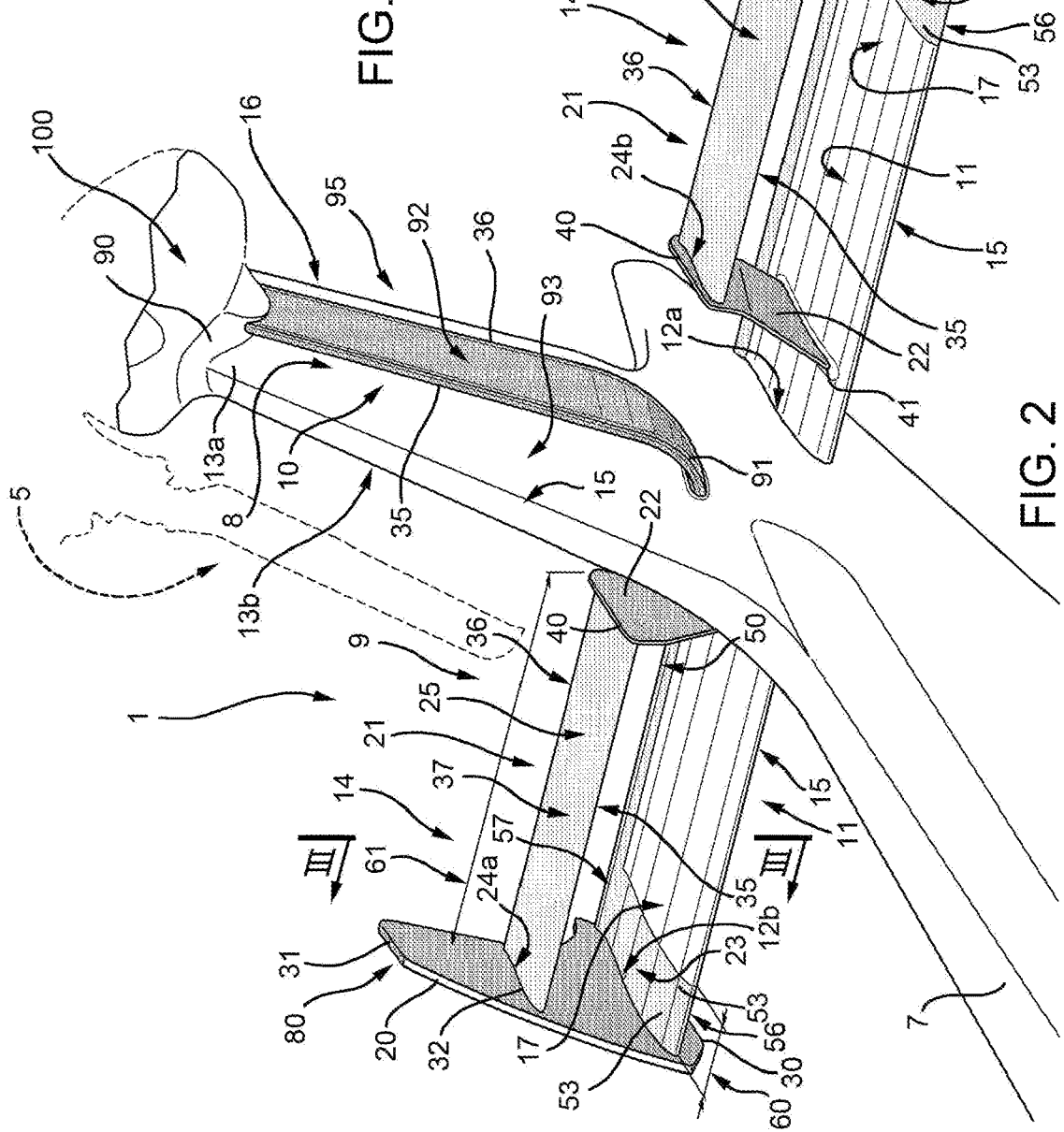
FIG. 2 is a view, on a highly enlarged scale, of a tail portion of the helicopter of FIG. 1.

Referring to FIGS. 2 and 3, the bottom surface 38 of the appendage 21 in interposed along the axis Z between the top surface 37 of the appendage 21 and the top surface 17 of the surface 11.

In other words, the appendage 21 is superimposed on the surface 11 along the axis Z.

The appendage 21 also comprises a pair of end edges 24a, 24b opposite to each other, parallel to the axis Y and respectively connected to the plate 20 and the plate 22.

The appendage 21 also has a length parallel to the axis Y and a width parallel to the axis X.

The plate 22 also comprises an edge 40 connected to the appendage 21 and an edge 41 connected to the surface 11.

The edges 40, 41 are opposite to each other, parallel to the axis Z and extend parallel to the axis Y.

In the case shown, the edge 40 is arranged above the edge 41.

In the case shown, the plate 22 is tilted towards plate 20, proceeding from the edge 41 towards the edge 40 with reference to a plane orthogonal to the axis Y and passing through the edge 41.

Referring to FIG. 3, the stabilizer 14 also comprises a pair of flaps 50, also known as Gurney flaps, applied to the respective opposite sides of the trailing edge 16 of the surface 11, lying on the same plane and both orthogonal to the trailing edge 16 so as to form a T-shape.

In particular, portion 23 comprises:

a zone 53 next to the plate 20 parallel to the axis Y and interposed between a section 56 of the leading edge 15 and a corresponding section 57 of the trailing edge 16 parallel to the axis X; and the flaps 50.

In the case shown in FIG. 2, the wingspan 60, namely the extension parallel to the axis Y, of the zone 53 ranges between approximately 5% and 35% of the wingspan 61 of the appendage 21, preferably between 15% and 20%.

Referring to FIG. 3, the chord 62 of the appendage 21, namely the distance between the leading edge 35 and the trailing edge 36, ranges between approximately 5% and 100%, preferably between approximately 30% and 70%, of the chord 63 of the surface 11, namely the distance between the leading edge 15 and the trailing edge 16.

The distance 64 between the chords 62, 63 measured parallel to the axis Z ranges between approximately 5% and 120%, preferably between approximately 20% and 100%, of the chord 63 of the surface 11.

The distance 65 between the chord 62 and the edge 31 ranges between 40% and 55% of the chord 63 of the surface 11.

The distance 66 between the chord 63 and the edge 31 ranges between 110% and 120% of the chord 63 of the surface 11.

The distance 67 parallel to the axis X between the leading edge 35 and leading edge 15 ranges between 50% of the chord 63 towards the nose 6 and 50% of the chord 63 on the side opposite to the nose 6.

The plates 20, 22, the appendage 21, the zone 53 of the stabilizer 14 and the Gurney flaps 50 form a reconfiguration kit 80 (FIG. 2) for a stabilizer of a helicopter comprising the surface 11 without the portion 23.

The fin 8 is shaped in an entirely similar manner to the stabilizer 14, where the surface 10 of the fin 8 is considered instead of the surface 11, and is therefore only synthetically described below.

In particular, corresponding or equivalent parts of the fin 8 and of the stabilizer 14 are indicated in FIGS. 2 and 3, where possible, with the same reference numerals.

The fin 8 comprises a support 90, adapted to support the rotor 5 and projecting in a cantilever fashion transversely to the surface 11 from both sides 13a, 13b of the fin 8.

On the side 13b opposite to the rotor 5 along the axis Y, the fin 8 comprises:

a plate 91 projecting in a cantilever fashion transversely to the surface 11, curved and interposed between the support 90 and a stabilizer 14; and an appendage 92 defining a further aerodynamic surface, extending between the support 90 and the plate 91, and spaced from surface 11 parallel to the axis Y.

The fin 8 also comprises a portion 93 interposed along the axis Z between the support 90 and the plate 91.

In the case shown, the support 90 is arranged above the plate 91.

The plate 91 and the appendage 92 are totally similar to the plates 22 and the appendage 21, respectively, and are therefore not described in detail hereinafter.

The support 90, the plate 91, the appendage 92 and the portion of the fin 8 interposed between the support 90 and the plate 92 define a closed wing surface 95 that develops an aerodynamic force with a main component parallel to the axis Y in forward flight conditions of the helicopter 1.

The support 90, the plate 91, the appendage 92 and the portion 93 of the stabilizer 14 form a reconfiguration kit 100 (FIG. 2) for a stabilizer of a helicopter comprising the surface 10 without the portion 93.

Operation of the helicopter 1 is described starting from low-speed forward flight or hovering conditions typical, for example, of the phases of take-off/landing.

In this condition, the reaction torque about the axis Z generated on the fuselage 2 by the operation of the main rotor 3 is substantially balanced by the tail rotor 5. In fact, due to the low or null speed of the helicopter 1, the aerodynamic force generated by the fin 8 is negligible.

Furthermore, in this condition, the downwash from the main rotor 3 towards the tail boom 7 strikes the stabilizers 14 of the tailplane 9.

The appendages 21 arranged above the surfaces 11 obstruct the passage of this wash towards the surfaces 11, which are therefore subjected to a particularly low or null downward thrust due to the wash of the main rotor 3.

Moreover, the small overall extension of the appendages 21 enable further reducing the downward thrust that this wash exerts on the tailplane 9.

In consequence, the nose-up moment about the axis Y generated by this thrust is reduced, with a consequent reduction in attitude variation of the helicopter 1 and in the corrections required of the pilot during the phases of take-off/landing.

Contrariwise, in high-speed forward flight conditions, the fin effectively contributes to counter the reaction torque generated by the main rotor 3, due to the aerodynamic forces generated both by the surface 10 and by the appendage 92.

Furthermore, in these conditions, the tailplane 9 generates aerodynamic thrust with a component parallel to the axis Z that enables keeping the helicopter 1 in stable equilibrium with respect to translation along the axis Z and rotation about the axis Y.

The presence of the fuselage 2 disturbs the aerodynamic flow that strikes the fin 8 and the tailplane 9.

In particular, the areas of the tailplane 9, and therefore of the surface 11, next to the fin 8 are struck by a substantially smaller airflow than that which strikes the closed wing surfaces 25 of the stabilizers 14.

Similarly, the areas of the fin 8, and therefore of the surface 10, next to the tailplane 9 are also struck by a substantially smaller airflow than that which strikes the closed wing surfaces 95 of the fin 8.

In lateral flight conditions, the surface 10 of the fin 8 is struck by a substantially smaller airflow than that which strikes the appendage 92. In other words, the surface 10 is aerodynamically shielded by appendage 92. In consequence, the aerodynamic resistance offered by the fin 8 in lateral flight is particularly reduced.

The kit 80 is used to reconfigure a helicopter equipped with stabilizers that each comprise only the surface 11 without the portion 23.

In greater detail, the plates 20, 22 are fixed to the edges 30, 41 of the surface 11 so as to arrange appendage 21 facing the surface 11.

The zone 53 is connected to the surface 11 so as to define an extension of the latter.

In particular, the zones 53 are connected to the relative plates 20 parallel to the axis Y.

Similarly, the kit 100 is used to reconfigure a helicopter equipped with a fin comprising only the surface 10 of the helicopter to be configured.

In greater detail, the plate 91 is fixed to the surface 10 so as to arrange the appendage 92 facing the surface 10 of the helicopter 1 to be configured and the appendage 92 is fixed to the support 90.

Figure 4:
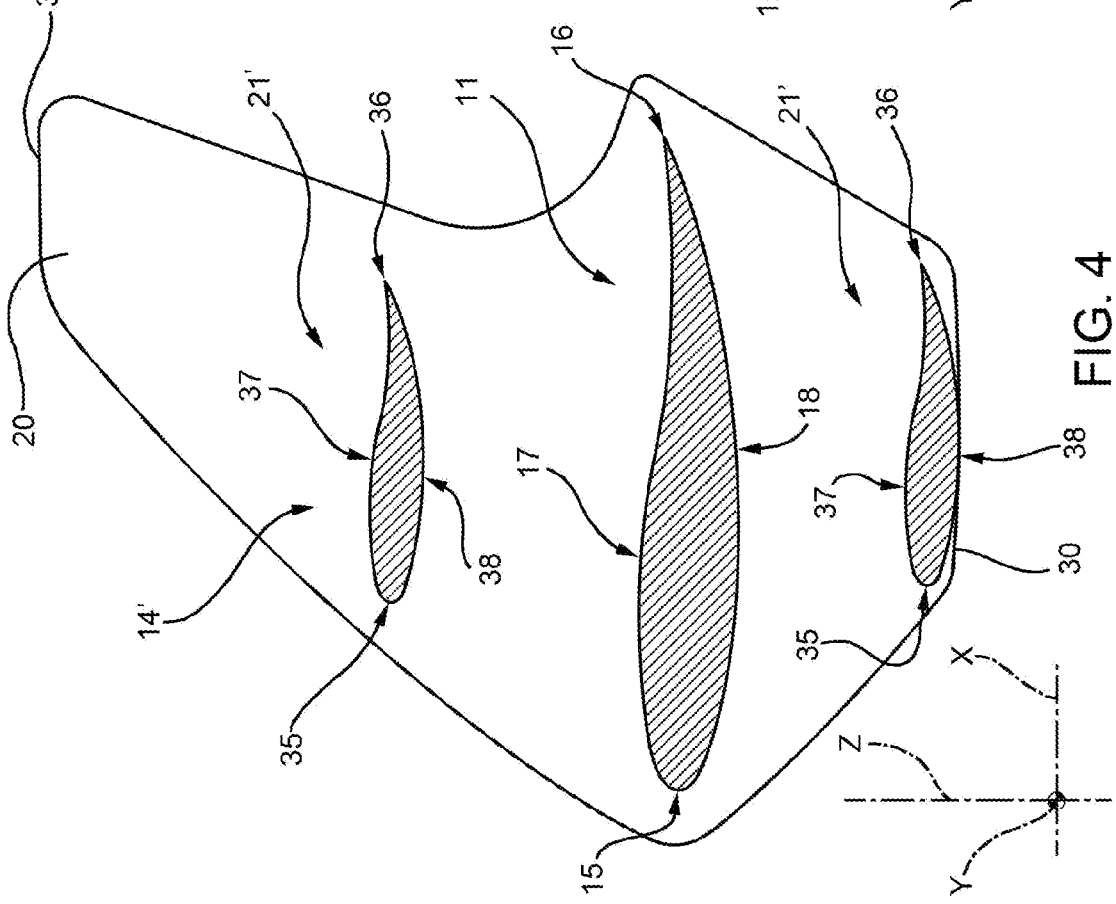
FIG. 4 is a section of the tail portion of a second embodiment of the helicopter made according to the present invention.

Referring to FIG. 4, reference numeral 14' indicates a stabilizer of a helicopter 1 according to a further embodiment of the invention.

The stabilizer 14' is similar to stabilizer 14 and will be described hereinafter only with regard to the differences; where possible, the same or equivalent parts of the stabilizers 14, 14' will be indicated with the same reference numerals.

The stabilizer 14' differs from stabilizer 14 in that it comprises:
  at least one appendage 21' arranged on the side of the top surface 17 of the surface 11 along the axis Z and spaced from the fin 8 along the axis Y, and at least a further appendage 21' arranged on the side of the bottom surface 18 of the surface 11 along the axis Z and spaced from the tail boom 7 along the axis Y.

In particular, the appendages 21' could be more than one and/or the further appendages 21' could be more than one.

Figure 5:
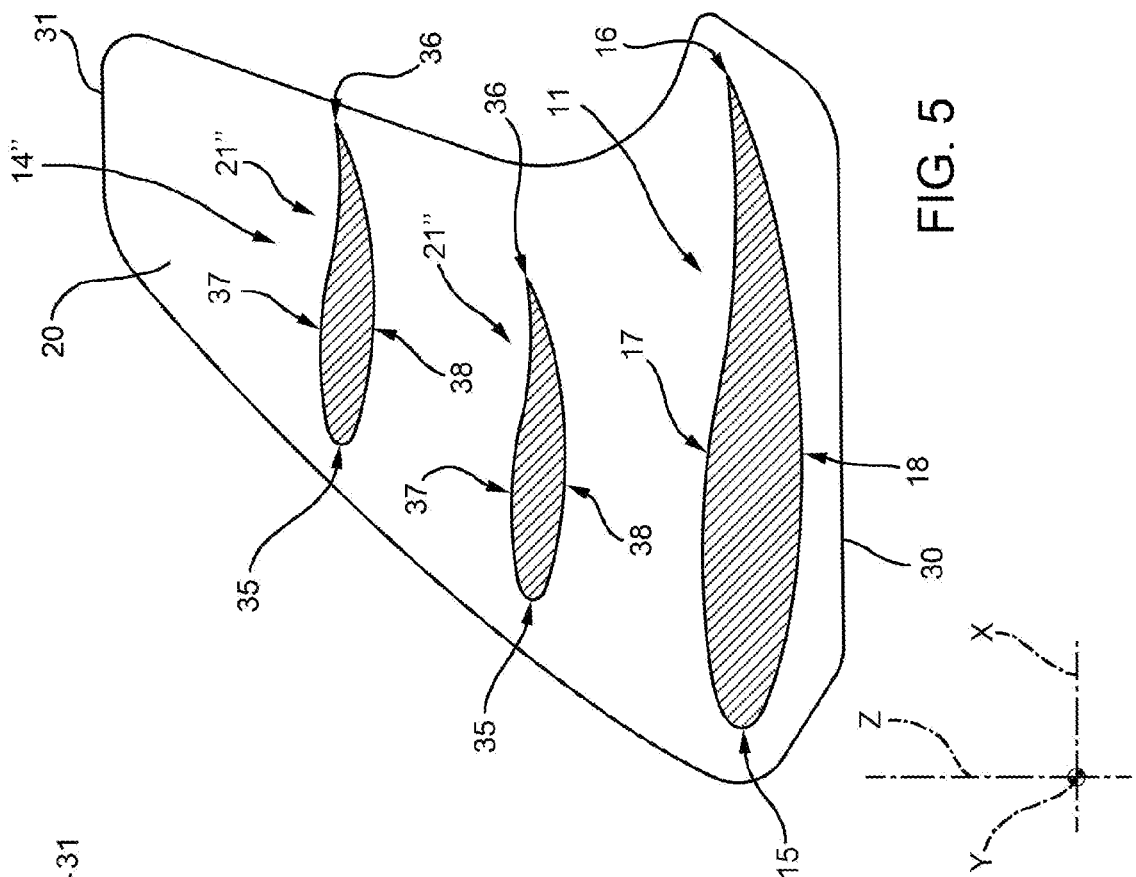
FIG. 5 is a section of the tail portion of a third embodiment of the helicopter made according to the present invention.

Referring to FIG. 5, reference numeral 14" indicates a stabilizer of a helicopter 1 according to a further embodiment of the invention.

The stabilizer 14" is similar to the stabilizer 14 and will be described hereinafter only with regard to the differences; where possible, the same or equivalent parts of the stabilizers 14, 14" will be indicated with the same reference numerals.

The stabilizer 14" differs from the stabilizer 14 in that it comprises at least two appendages 21" arranged on the side of the top surface 17 of the surface 11, spaced from the fin 8 and staggered along the axis X.

Alternatively, the stabilizer 14" could comprise at least two appendages 21" arranged on the side of the bottom surface 18 of the surface 11, spaced from the fin 8 and staggered along the axis X.

From an examination of the characteristics of the helicopter 1, the kits 80, 100, and the method according to the present invention, the advantages that can be attained therewith are evident.

In particular, the appendages 21 of the stabilizers 14 generate an aerodynamic force, and are spaced from the respective surfaces 11 parallel to the axis Z and from the fin 8 parallel to the axis Y.

In this way, in high-speed conditions, the aerodynamic forces of lift/negative lift generated by the appendages 21 along the axis Z are added to those generated by the surfaces 11 and contribute, on one hand, as a prevailing effect for increasing the longitudinal stability of the helicopter 1.

On the other hand, since the appendages 21 are spaced from the fin 8, the stabilizers 14 are less heavy and less bulky than the stabilizers of the known solutions described in the introductory part of this description, with obvious advantages for the helicopter 1.

This weight reduction is obtained without any penalization regarding the aerodynamic force generated by stabilizers 14, as the fuselage 2 and the main rotor 3 significantly disturb the airflow that arrives in the area interposed between the appendages 21 and the fin 8, making it rather inefficient to generate an aerodynamic force in this area.

In other words, the tailplane 9 enables a high degree of longitudinal stability of the helicopter 1 with reduced weight.

In low-speed conditions, the surfaces 11 are in the turbulent wash of the appendages 21. The downward thrust generated by the wash of the main rotor 3 on the tailplane 9 is thus reduced with respect to traditional solutions, reducing the tendency of the helicopter 1 to assume a nose-up attitude and improving the pilot's comfort and visibility during landing operations.

Each stabilizer 14 also comprises the relative closed wing surface 25 defined by the plates 20, 22, the appendage 21 and the portion 23 of the stabilizer 14 interposed between the plates 20, 22.

The closed wing surfaces 25 significantly reduce the negative effects of induced drag and maximize efficiency, i.e. the ratio between lift and generated resistance, of the respective stabilizers 14. The stabilizers 14 thus increase the value of the aerodynamic force generated for the same surface or allow obtaining the same generated force with a smaller surface, thereby ensuring longitudinal stability of the helicopter 1 with less weight and bulk.

Similarly to the tailplane 9, the fin 8 enables, on one hand, to increase, in high-speed flight, the overall aerodynamic force generated with a component parallel to the axis Y, due to the presence of appendage 92, which generates a further aerodynamic force in addition to that generated by the surface 10.

Since appendage 92 is spaced from the tailplane 9, it is possible to reduce the overall weight of the fin 8 without penalizing the overall amount of the aerodynamic force generated, as the area interposed between appendage 92 and the tailplane 9 is in the turbulent wash generated by the main rotor 3 and by the fuselage 2 and is therefore substantially inefficient from the aerodynamic viewpoint.

On the other hand, referring to the lateral flight conditions of the helicopter 1, i.e. a condition in which the helicopter moves sideways parallel to the axis Y, the surface 10 is in the wash of the appendage 92 and is therefore struck by a more disturbed airflow. This results in a reduction in the overall aerodynamic resistance of the fin 8 in lateral flight conditions.

Due to this, the increase in aerodynamic force obtained at high speed causes a decidedly lower increase in resistance of the fin 8 in lateral flight 8 than that which would be attained if the increase in aerodynamic force was obtained by simply increasing the extension of the surface 10 without introducing the appendage 21.

Similarly to each stabilizer 14, the fin 8 comprises the closed wing surface 95 defined by the support 90, by the plate 91, by the appendage 92 and by the portion 93 interposed between the support 90 and the plate 91.

Similarly to the closed wing surface 25, the wing surface 95 also significantly reduces the negative effects of induced drag and maximizes efficiency, namely the ratio between lift and generate resistance, of the fin 8. Due to the presence of the closed wing surface 95, the value of the aerodynamic force generated for the same surface is thus increased, or it is possible achieve the same generated force with a smaller surface, thereby ensuring control of the yaw of the helicopter 1 at high speed in an aerodynamically efficient manner.

Summarizing, the applicant has observed that the introduction of the appendages 21, 92 enables raising the lift slope of the lift coefficient with respect to the angle of attack, thereby reducing the increase in maximum lift in stall conditions.

Since the angles of attack of the fin 8 and the tailplane 9 corresponding to the normal flight conditions of the helicopter 1—forward flight, lateral flight, hovering, low-speed flight during take-off/landing, are less than the stall angle of attack, the appendages 21, 92 enable increasing the value of the aerodynamic forces generated by the fin 8 and by the tailplane 9 at the angles of attack typical of operation of the helicopter 1.

The flaps 50 applied orthogonally to the trailing edge 16 enable increasing the aerodynamic force generated by the surface 11 against a small increase in aerodynamic resistance. In particular, due to the T-shape of the flaps 50 and the trailing edge 16, it is possible to increase the lift/negative lift generated by the surfaces 11 and the relative maximum value of the lift coefficient as the angle of attack changes.

The appendages 21', 21" allow increasing the aerodynamic force generated by the tailplane 9 and, consequently, the stabilization effect at high speed, further increasing the shielding effect of the surface 11 from the downward wash generated by the main rotor 3.

The kits 80, 100 enable reconfiguring a helicopter with a traditional fin and tailplane by simply:
    fixing the plates 20, 22 to the edges 30, 41 of the surface so as to arrange the appendage 21 facing the surface 11, and fixing the zone 53 to the surface 11 so as to define its extension; and/or
    fixing the plate 91 to the respective edge of surface 10 and the appendage 92 to the support 90, so as to arrange the appendage 92 facing the surface 10 of the helicopter to be configured.

Since the plate 22 is spaced from the fin 8, the application of the kit 80 does not require any action on the tail boom 7, enormously simplifying the reconfiguration of the helicopter 1.

Similarly, the application of the kit 100 does not require any action on the tailplane 9 as the plate 92 is spaced from the stabilizer 14, further simplifying the reconfiguration of the helicopter 1.

The T-shaped appendages 50 are particularly advantageous when incorporated in the kit 80. In fact, the T-shape allows increasing the lift generated by the stabilizers 14 without altering the attitude of the helicopter 1 with respect to a condition in which the kit 80 was not present.

It is clear that modifications and variants can be made to the helicopter 1, the kit 80, 100 and the method set forth herein without departing from the scope defined in the claims.

In particular, each stabilizer 14 might not comprise the relative the plate 22. Similarly, the fin 8 might not comprise the plate 91.

Furthermore, each stabilizer 14 might comprise a plate 22 spaced along the axis Z from the relative surface 11. Similarly, the fin 8 might comprise a plate 91 spaced along the axis Z from the relative surface 10.

The element 90 might not be the rotor support.

Finally, the appendages 21', 22" might be carried by the fin 8 instead of by the stabilizers 14, 14".

The invention claimed is:
1. A helicopter comprising:
a tail boom;
a fin projecting from said tail boom; and
a tailplane arranged at said tail boom and transversal to said fin;

at least one of said fin and said tailplane defining a first aerodynamic surface generating, in use, a first aerodynamic force;
at least a first element transversal to said first aerodynamic surface; and
a second aerodynamic surface generating, in use, a second aerodynamic force, connected to said first element, facing and spaced from said first aerodynamic surface;
said second aerodynamic surface being spaced from the other of said fin and said tailplane;
said second aerodynamic surface extending in a spanwise direction in parallel to the spanwise direction of said first aerodynamic surface; wherein said tailplane comprises a pair of stabilizers projecting in a cantilever fashion from opposite sides of said tail boom;
each said stabilizer comprising a corresponding said first aerodynamic surface, a corresponding said second aerodynamic surface and a corresponding said first element; and
a second element spaced from said first element, transversal to said first and second aerodynamic surfaces, and extending starting from said second aerodynamic surface towards said first aerodynamic surface, wherein said second aerodynamic surface intersects the first element at a location between a top edge and a bottom edge of the first element such that said second aerodynamic surface lies entirely below the top edge.

2. The helicopter according to claim 1, wherein said second element is connected to said first aerodynamic surface and in that said first and second elements, said second aerodynamic surface and a portion of said first aerodynamic surface-interposed between said first and second aerodynamic surfaces define a closed wing surface; wherein a plane that contains said second aerodynamic surface intersects and is transversal to the fin.

3. A helicopter comprising:
a tail boom;
a fin projecting from said tail boom; and
a tailplane arranged at said tail boom and transversal to said fin;
at least one of said fin and said tailplane defining a first aerodynamic surface generating, in use, a first aerodynamic force;
at least a first element transversal to said first aerodynamic surface; and
a second aerodynamic surface-generating, in use, a second aerodynamic force, connected to said first element, facing and spaced from said first aerodynamic surface;
said second aerodynamic surface being spaced from the other of said fin and said tailplane;
said second aerodynamic surface extending in a spanwise direction in parallel to the spanwise direction of said first aerodynamic surface; wherein said tailplane comprises a pair of stabilizers projecting in a cantilever fashion from opposite sides of said fuselage tail boom;
each said stabilizer comprising a corresponding said first aerodynamic surface, a corresponding said second aerodynamic surface and a corresponding said first element;
wherein the second aerodynamic surface is arranged above the first aerodynamic surface and is configured to obstruct passage of downwash from a main rotor towards the first aerodynamic surface.

4. The helicopter according to claim 3, wherein said first aerodynamic surface comprises a first leading edge and a first trailing edge opposite to each other with reference to a normal forward direction of said helicopter orientated from said tail boom to a nose of said helicopter;
said second aerodynamic surface comprising a second leading edge and a second trailing edge opposite to each other with reference to said normal forward direction;
wherein said first leading edge is arranged in a forward position with respect to said second leading edge with reference to said normal forward direction; and/or
wherein said first trailing edge is arranged in a rearward position with respect to said second trailing edge with reference to said normal forward direction.

5. The helicopter according to claim 4, further comprising a pair of appendages applied on at least one of said first and second trailing edges and transversal thereto, arranged on respective opposite sides of said at least one of said first or second trailing edge so as to form a T configuration with said at least one of said first and second trailing edges.

6. The helicopter according to claim 3, wherein said first aerodynamic surface comprises a first top surface and a first bottom surface;
wherein said helicopter further includes at least two said second aerodynamic surfaces arranged on the same side of said first top surface or of said first bottom surface of said first aerodynamic surface; and/or
at least one said second aerodynamic surface arranged on the side of said first top surface and at least a further said second aerodynamic surface arranged on the side of said first bottom surface of said first aerodynamic surface.

7. The helicopter according to claim 3, wherein said first element is arranged on a first end of said first aerodynamic surface opposite to said other of said fin and said tailplane.

8. The helicopter according to claim 3, wherein said first aerodynamic surface is defined by said tailplane and said second aerodynamic surface is spaced from said fin.

9. The helicopter according to claim 8, wherein said second aerodynamic surface comprises a second top surface and a second bottom surface opposite to each other;
said second bottom surface facing said first top surface;
said helicopter further comprising a main rotor operable to generate an airflow directed, in use, along a first axis and towards said tailplane;
said second aerodynamic surface being arranged transversely to said first axis.

10. A helicopter comprising:
a tail boom;
a fin projecting from said tail boom; and
a tailplane arranged at said tail boom and transversal to said fin;
said fin defining a first aerodynamic surface generating, in use, a first aerodynamic force;
at least a first element transversal to said first aerodynamic surface; and
a second aerodynamic surface-generating, in use, a second aerodynamic force, connected to said first element, facing and spaced from said first aerodynamic surface;
said second aerodynamic surface being spaced from said fin;
said second aerodynamic surface extending in a spanwise direction in parallel to the spanwise direction of said first aerodynamic surface;
said fin further defining said second aerodynamic surface, said second aerodynamic surface being spaced from said tailplane.

11. An upgrade kit for a helicopter comprising:
at least one first element transversely fixable to a first aerodynamic surface defined by a tailplane or a fin of said helicopter;
a second aerodynamic surface transversal to said first element and adapted to generate, in use, an aerodynamic force;
said first element comprising:
an edge fixable to said first aerodynamic surface; and
a zone separate from said edge and from which said second aerodynamic surface projects in a cantilever fashion;
said second aerodynamic surface being configured to be arranged, in use, at a distance from the other of said tailplane or fin of said helicopter;
said second aerodynamic surface extending in a spanwise direction in parallel to the spanwise direction of said first aerodynamic surface;
said kit further comprising:
a second element projecting in a cantilever fashion from said first element in a staggered position with respect to said second aerodynamic surface;
wherein said tailplane comprises a pair of stabilizers projecting in a cantilever fashion from opposite sides of said fuselage;
each said stabilizer comprising a corresponding said first aerodynamic surface, a corresponding said second aerodynamic surface and a corresponding said first element.

12. The kit according to claim 11, characterized in that it comprises a plate transversal to said second aerodynamic surface and arranged on the opposite side of said first element with respect to said first aerodynamic surface;
said first element and the plate being arranged on the same side of said first aerodynamic surface, wherein said second aerodynamic surface intersects the plate at a location between a top edge and a bottom edge of the plate such that said second aerodynamic surface entirely lies below the top edge.

13. An upgrade method for a helicopter; said helicopter comprising:
a tail boom;
a fin projecting from said tail boom; and
a tailplane arranged on said tail portion and transversal to said fin;
at least one of said fin and said tailplane defining a first aerodynamic surface;
said method comprising the steps of:
i) arranging a first element transversely to said first aerodynamic surface;
ii) arranging a second aerodynamic surface spaced from said first aerodynamic surface and from the other of said tailplane and fin; and
iii) connecting said second aerodynamic surface to said first element;
said second aerodynamic surface extending in a spanwise direction in parallel to the spanwise direction of said first aerodynamic surface;
wherein said tailplane comprises a pair of stabilizers projecting in a cantilever fashion from opposite sides of said fuselage;
each said stabilizer comprising a corresponding said first aerodynamic surface, a corresponding said second aerodynamic surface and a corresponding said first element; and
wherein the second aerodynamic surface is arranged above the first aerodynamic surface and is configured to obstruct passage of downwash from a main rotor towards the first aerodynamic surface.

14. An upgrade kit for a helicopter comprising:
at least one first element transversely fixable to a first aerodynamic surface defined by a fin of said helicopter;
a second aerodynamic surface transversal to said first element and adapted to generate, in use, an aerodynamic force;
said first element comprising:
an edge fixable to said first aerodynamic surface; and
a zone separate from said edge and from which said second aerodynamic surface projects in a cantilever fashion;
said second aerodynamic surface being configured to be arranged, in use, at a distance from the other of said tailplane or fin of said helicopter;
said second aerodynamic surface extending in a spanwise direction in parallel to the spanwise direction of said first aerodynamic surface;
said kit further comprising:
a second element projecting in a cantilever fashion from said first element in a staggered position with respect to said second aerodynamic surface;
wherein said first aerodynamic surface is defined by said fin, said fin further defining said second aerodynamic surface, said second aerodynamic surface being spaced from said tailplane.

15. An upgrade method for a helicopter; said helicopter comprising:
a tail boom;
a fin projecting from said tail boom; and
a tailplane arranged on said tail portion and transversal to said fin;
said fin defining a first aerodynamic surface;
said method comprising the steps of:
i) arranging a first element transversely to said first aerodynamic surface;
ii) arranging a second aerodynamic surface spaced from said first aerodynamic surface and from the fin; and
iii) connecting said second aerodynamic surface to said first element;
said second aerodynamic surface extending in a spanwise direction in parallel to the spanwise direction of said first aerodynamic surface;
said fin further defining said second aerodynamic surface, said second aerodynamic surface being spaced from said tailplane.

* * * * *